(12) United States Patent  
Oder, II et al.

(10) Patent No.: US 8,328,095 B2
(45) Date of Patent: *Dec. 11, 2012

(54) SECURE PAYMENT CARD TRANSACTIONS

(75) Inventors: John David Oder, II, Las Vegas, NV (US); John David Oder, Las Vegas, NV (US); Kevin James Cronic, Las Vegas, NV (US); Steven Mark Sommers, Las Vegas, NV (US); Dennis William Warner, Las Vegas, NV (US)

(73) Assignee: SHIFT4 Corporation, Las Vegas, NV (US)

( * ) Notice: Subject to any disclaimer, the term of this patent is extended or adjusted under 35 U.S.C. 154(b) by 5 days.

This patent is subject to a terminal disclaimer.

(21) Appl. No.: 13/014,604

(22) Filed: Jan. 26, 2011

(65) Prior Publication Data

US 2011/0125597 A1 May 26, 2011

Related U.S. Application Data

(63) Continuation of application No. 11/750,181, filed on May 17, 2007, now Pat. No. 7,891,563, and a continuation of application No. 11/750,239, filed on May 17, 2007, now Pat. No. 7,770,789, and a continuation of application No. 11/750,184, filed on May 17, 2007, now Pat. No. 7,841,523.

(51) Int. Cl.
*G06K 15/00* (2006.01)
(52) U.S. Cl. ......................................... 235/383; 235/380
(58) Field of Classification Search .................. 235/383, 235/380, 381; 705/64, 70
See application file for complete search history.

(56) References Cited

U.S. PATENT DOCUMENTS

| 5,727,163 | A  | 3/1998  | Bezos            |
| 6,000,832 | A  | 12/1999 | Franklin et al.  |
| 6,263,383 | B1 | 7/2001  | Lee et al.       |
| 6,324,526 | B1 | 11/2001 | D'Agostino       |
| 6,908,030 | B2 | 6/2005  | Rajasekaran et al.|
| 6,986,040 | B1 | 1/2006  | Kramer et al.    |

(Continued)

FOREIGN PATENT DOCUMENTS

EP  1 324 564 A2  7/2003
WO  WO 01/29637  4/2001

(Continued)

OTHER PUBLICATIONS

Extended European Search Report issued in European application No. 08755755.9 on Sep. 9, 2011.

(Continued)

*Primary Examiner* — Ahshik Kim
(74) *Attorney, Agent, or Firm* — Knobbe, Martens, Olson & Bear LLP

(57) ABSTRACT

Payment card transactions at a point of sale (POS) are secured in certain embodiments by intercepting, with a POS security layer installed on a POS terminal, payment data from the POS terminal, transmitting the payment data from the POS security layer to a server security application installed on a POS server, and providing false payment data from the POS security layer to a POS terminal application installed on the POS terminal. The false payment data in various embodiments is processed as if it were the payment data, such that the POS terminal transmits an authorization request to the POS server using the false payment data. In addition, the authorization request may be transmitted from the POS server to a payment gateway.

18 Claims, 8 Drawing Sheets

U.S. PATENT DOCUMENTS

| | | | |
|---|---|---|---|
| 7,028,191 | B2 | 4/2006 | Michener et al. |
| 7,506,812 | B2 | 3/2009 | von Mueller et al. |
| RE40,753 | E | 6/2009 | Wang et al. |
| 7,568,621 | B2 | 8/2009 | von Mueller et al. |
| 7,617,390 | B2 | 11/2009 | Sharma et al. |
| 7,740,173 | B2 | 6/2010 | von Mueller et al. |
| 7,742,983 | B2 | 6/2010 | Ukigawa et al. |
| 7,770,789 | B2 | 8/2010 | Oder et al. |
| 7,841,523 | B2 * | 11/2010 | Oder et al. .................. 235/383 |
| 7,891,563 | B2 * | 2/2011 | Oder et al. .................. 235/383 |
| 2001/0021925 | A1 | 9/2001 | Ukigawa et al. |
| 2001/0039533 | A1 | 11/2001 | Pare, Jr. et al. |
| 2002/0031225 | A1 | 3/2002 | Hines |
| 2003/0004881 | A1 | 1/2003 | Shinzaki et al. |
| 2003/0154387 | A1 | 8/2003 | Evans et al. |
| 2004/0128239 | A1 | 7/2004 | Smires et al. |
| 2004/0182921 | A1 | 9/2004 | Dickson et al. |
| 2004/0254848 | A1 | 12/2004 | Golan et al. |
| 2005/0147250 | A1 | 7/2005 | Tang |
| 2005/0177442 | A1 | 8/2005 | Sullivan et al. |
| 2005/0177521 | A1 | 8/2005 | Crosson Smith |
| 2005/0204172 | A1 | 9/2005 | Malcolm |
| 2006/0036541 | A1 | 2/2006 | Schleicher |
| 2006/0049256 | A1 | 3/2006 | von Mueller et al. |
| 2006/0064376 | A1 | 3/2006 | Ukigawa et al. |
| 2006/0261159 | A1 | 11/2006 | Redick et al. |
| 2006/0265736 | A1 | 11/2006 | Robertson et al. |
| 2007/0069008 | A1 | 3/2007 | Klein et al. |
| 2007/0170243 | A1 | 7/2007 | Desany et al. |
| 2007/0241183 | A1 | 10/2007 | Brown et al. |
| 2008/0022400 | A1 | 1/2008 | Cohen et al. |
| 2008/0091944 | A1 | 4/2008 | von Mueller et al. |
| 2008/0179401 | A1 | 7/2008 | Hart et al. |

OTHER PUBLICATIONS

"Understanding PINs & PIN Pad Security in Debt Transactions, *A White Paper*," VeriFone, pp. 1-16, Aug. 1994.

"Shift4 Enhanced Interface Driver for MICROS 3700, *Technical Installation Guide*," SHIFT4 Corporation, Las Vegas, Nevada, pp. 1-206, Jun. 15, 2005.

"Shift4 Enhanced Interface Driver for MICROS 8700," SHIFT4 Corporation, Las Vegas, Nevada, pp. 1-250, Jul. 18, 2006.

"UTG Technical Reference Guide Version 2, *A Guide to Shift4's Universal Transaction Gateway*," SHIFT4 Corporation, Las Vegas, Nevada, pp. 1-144, Nov. 22, 2006.

Downloaded from website: http://www.magtek.com/products/card_readers/Magnesafe/99800068_1.06.pdf, MagneSafe™ Readers, Brochure, P/N9980068, Rev. 1.01 Feb. 2007.

"MAGNESA™ to Showcase MagneSafe™ Reader & Website Authentication for Secure Internet Banking and e-Commerce at the RSA Conference and Exposition, *Unprecedented verification platform for secure Internet Banking, e-Commerce and website authentication for online financial transactions*," MAGNESA, LLC, Press Release dated Feb. 5, 2007.

Downloaded from website: http://www.magtek.com/media/press_releases/?sort=070416a, "MagTek and Element Payment Services, Inc. Showcase PCI Compliance & Fraud Protection in a Swipe at ETA", Business Wire, Press Release dated Apr. 19, 2007.

Downloaded from website: http://www.homecompliance.com, "TrustCommerce and MAGNESA Deliver Simplified PCI Compliance with End-to-End Data Encryption," Compliance Home, FFIEC News dated Apr. 24, 2007.

International Search Report and Written Opinion for International Application No. PCT/US08/63966, mailed on Sep. 9, 2008, in 15 pages.

U.S. Appl. No. 11/750,181, filed May 17, 2007 including filing receipt, specification, and drawings.

Examination Report issued in European application No. 08755755.9 on May 18, 2012.

* cited by examiner

ACTUAL DATA 410: 1234567890123456 = 0101352916085 ?

ENCRYPTED DATA 430: 9PQ6F75BG1093A2Y5667T5Y9100222265P00000

FALSE DATA 450: 1234000000003456 = 99990000000000 ?

RE-ENCRYPTED DATA 460: PQ6159AA97074D8A115HZQR09P213P03X00000

COMBINED FALSE & RE-ENCRYPTED DATA 470: 1234000000003456 = 99990000000000 ? PQ6159AA97074D8A115HZQR09P213P03X00000

ACTUAL DATA 410: 1234567890123456 = 0101352916085 ?

FIG. 8

SECURE PAYMENT CARD TRANSACTIONS

RELATED APPLICATIONS

The present application claims priority benefit under 35 U.S.C. §120 to and is a continuation of the following U.S. patent applications:

| Ser. No. | Title | Filed |
|---|---|---|
| 11/750,181 | Secure Payment Card Transactions | May 17, 2007 |
| 11/750,239 (Now U.S. Pat. No. 7,770,789) | Secure Payment Card Transactions | May 17, 2007 |
| 11/750,184 (Now U.S. Pat. No. 7,841,523) | Secure Payment Card Transactions | May 17, 2007 |

The present application incorporates the foregoing disclosures herein by reference in their entirety.

BACKGROUND

1. Field

The present disclosure relates to payment systems.

2. Description of the Related Art

The use of payment cards such as credit cards, debit cards, and gift cards has become ubiquitous in our current commercial transaction society. Virtually every merchant, as well as other facilities where monetary transactions occur for the purchase of goods or services, accept one or more types of payment cards for these transactions. Once a payment card is presented to a particular merchant at a point of sale to purchase goods or services, the payment card is usually read using a card swipe reader. Alternatively, payment data is entered manually through a pin pad or keyboard or through a combination of card swipe and manual entry.

The payment data is transmitted to an authorizing entity, which may be a card processor, card association, issuing bank, or other entity, along with information relating to purchase price and identification information of the particular merchant. In some instances, the information passes through one or more intermediaries before reaching the authorizing entity. The authorizing entity approves or disapproves the transaction. Once a decision is made at the authorizing entity, a return message is sent to the merchant indicating the disposition of the transaction.

As payment card transactions become more ubiquitous, so do thefts of payment data. Thefts can come from many sources, including employees, malicious software, and hardware devices for intercepting payment data. Perpetrators obtain payment data, including personal account numbers (PANs), personal identification numbers (PINs), expiration dates, and the like, for purposes of committing fraud. In some instances, thieves use the payment data to obtain goods, services, and cash. In other instances, perpetrators sell payment data to others who fraudulently use the cards. These thefts often occur at the point of sale.

SUMMARY

Payment card transactions at a point of sale (POS) are secured in certain embodiments by intercepting, with a POS security layer installed on a POS terminal, payment data from the POS terminal, transmitting the payment data from the POS security layer to a server security application installed on a POS server, and providing false payment data from the POS security layer to a POS terminal application installed on the POS terminal. The false payment data in various embodiments is processed as if it were the payment data, such that the POS terminal transmits an authorization request to the POS server using the false payment data. In addition, the authorization request may be transmitted from the POS server to a payment gateway.

Neither this summary nor the following detailed description purports to define the inventions. The inventions are defined by the claims.

BRIEF DESCRIPTION OF THE DRAWINGS

FIG. 8 is an exemplary block diagram illustrating certain embodiments of payment data.

DETAILED DESCRIPTION OF EXEMPLARY EMBODIMENTS

Specific embodiments of the inventions will now be described with reference to the drawings. These embodiments are intended to illustrate, and not limit, the present inventions. The scope of the inventions is defined by the claims.

The term "payment card" encompasses at least credit cards, debit cards, bank cards, smart cards, automatic teller machine (ATM) cards, and gift cards. In addition, other forms of payment may be interchangeable with the payment cards described herein, including RFID-enabled devices, wireless devices, and other electronic or magnetic devices that contain payment data. In addition, although the term payment card is used throughout, certain embodiments of the systems and methods may also be used to process identification cards such as drivers' licenses, security access cards, check cashing cards, and the like. For instance, instead of obtaining authorization of a payment card, various embodiments of the systems and methods described herein may be used to securely transmit and store identification card data.

Figure 1:
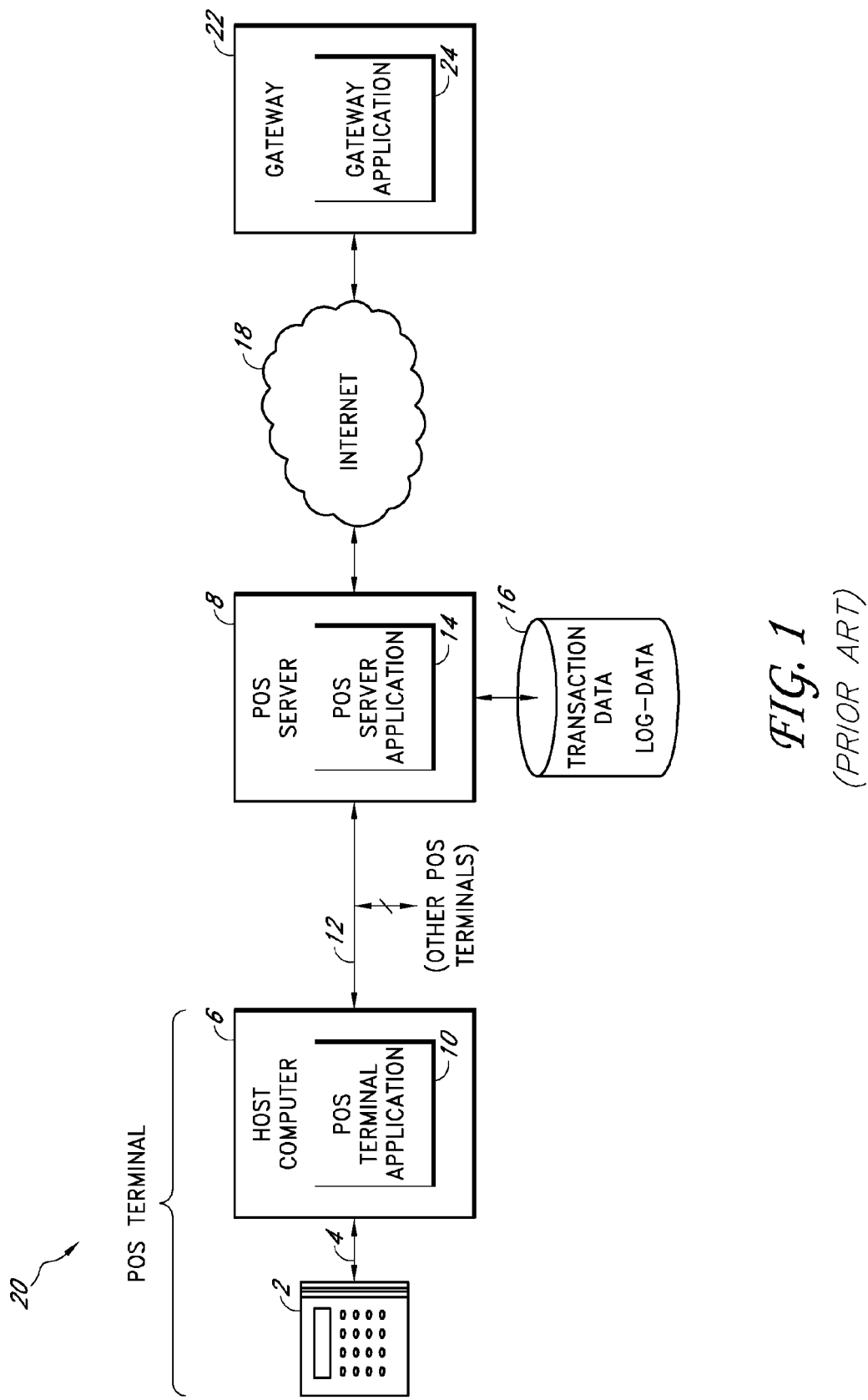
FIG. 1 is an exemplary block diagram illustrating a prior art point-of-sale system.

To further illustrate the problems of currently available payment systems, FIG. 1 depicts a prior art payment system at a point of sale. The point of sale can be a payment point at a merchant's place of business to which a customer presents a payment card for purchase or rental of goods and services. The point of sale can also be considered more generally as the merchant's place of business. The point of sale may include, for example, a cash register, a payment interface at a gas pump, a restaurant cashier, a front desk at a hotel, a rental car desk, or the like. In some locations, such as hotels, there may be multiple points of sale, such as at the front desk, at a restaurant, and at a gift shop. Regardless of the location of the POS 20, payment data is often not transmitted securely from one point to another and/or stored without adequate protection.

The payment system includes a POS terminal 20. The POS terminal 20 includes a card entry device 2 and a host computer 6. The card entry device 2 is a pin pad, card swipe reader, computer keyboard, or the like, and is used to capture or enter the payment data. The card entry device 2 transmits the payment data to the host computer 6 over link 4, which is a cable or the like. The host computer 6 may be a cash register, workstation, desktop computer, or the like.

In many cases, the link 4 is not secure because encryption is not used on the link 4 to protect the payment data. However, even when encryption is used, the card entry device 2 will still not be secure between the point of receiving the payment data and the point of encryption. A software or hardware keylogger, for example, residing on the card entry device 2 or even on the host computer 6 could intercept the payment data prior to the encryption of that data. Thus, both the card entry device 2 and the link 4 are vulnerable to payment data theft.

The host computer 6 executes a POS terminal application 10. The POS terminal application 10 is responsible for receiving the payment data from the card entry device 2. The POS terminal application 10 sends the payment data along with an authorization request, to determine whether the payment card has sufficient funds, to a POS server 8 over a network 12. Like the card entry device 2, the POS terminal application 10 on the host computer 6 might be compromised by malware, spyware, keyloggers, viruses, or the like. In addition, the network 12 may transfer unencrypted payment data to the POS server 8, creating vulnerabilities to packet sniffers, which intercept and log network traffic.

The POS server 8 is a computer typically located at the merchant's place of business or at a remote location owned and operated by the merchant. The POS server 8 executes a POS server application 14, which receives the payment data and authorization request from the POS terminal application 10. The POS server application 14 transmits the payment data for authorization to a gateway 22, which requests authorization from a card processor in communication with an authorizing entity.

The POS server application 14 also stores transaction data and log data, both of which include the payment data, in a database 16. Transaction data is stored to enable the merchant to process incremental authorizations and settlements, such as a restaurant tip authorizations and rental car returns (see FIG. 9 for additional details). Log data is stored, among other reasons, for a technician to be able to troubleshoot the POS terminal 20. A drawback to storing payment data at the POS terminal 20 is that numerous payment card numbers are stored in unencrypted form in a single location, providing relatively easy access for a thief to obtain this unprotected data.

Figure 2:
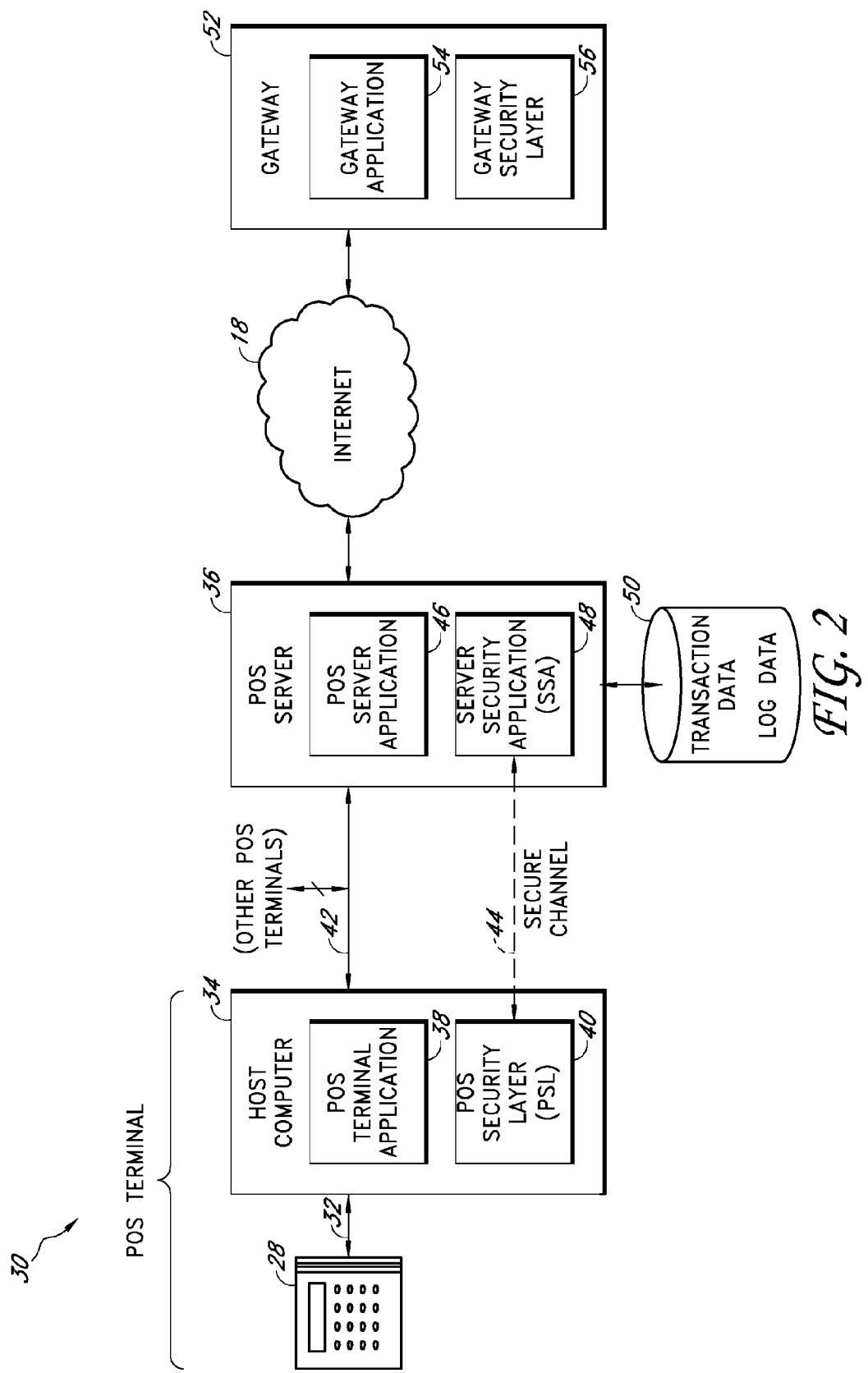
FIG. 2 is an exemplary block diagram illustrating an embodiment of a point-of-sale system.

Turning to FIG. 2, an improved POS system is shown, which reduces or eliminates at least some of the problems found in the art. Various components of the POS system protect payment data at the card entry device 28 and during transit from a POS terminal 30 to a POS server 36. In addition, various components of the POS system reduce the amount of payment data stored at the merchant's place of business. Consequently, certain embodiments of the POS system overcome some or all of the problems described above.

The POS terminal 30 is a computer system for receiving payment data and requesting payment card authorizations. For example, the POS terminal 30 might be a computer terminal and card swipe device at a grocery checkout line. The POS terminal 30 of certain embodiments includes a combination of software and hardware components.

A business might have multiple POS terminals 30, each communicating with a single POS server 36. Some hotels, for instance, include POS terminals 30 at the front desk, in the hotel restaurant, and in the hotel gift shop, all of which are connected by a network to a common POS server 36. In another example, a retail or grocery store might include POS terminals 30 at each checkout line.

The POS terminal 30 and POS server 36 may be identical to the POS terminal and server of the prior art system of FIG. 1 but augmented with a POS security layer (PSL) 40 and server security application (SSA) 48. These two software components can be added to a preexisting payment system that is already deployed to effectively secure the system.

POS terminals 30 may perform specialized functions in different settings. For example, a restaurant POS terminal 30 might process an initial authorization and a later incremental authorization for processing a tip. A POS terminal 30 at a rental car establishment or hotel might preauthorize a car or room for a certain number of days, and then later request additional authorization when the car is returned late or when a guest checks out of the room late. These specialized functions are described further in connection with FIG. 9, below.

In certain embodiments, the POS terminal 30 includes a card entry device 28 and a host computer 34. The card entry device 28 is a pin pad, card swipe reader, computer keyboard, touch screen, or the like. Some implementations of the POS terminal 30 do not include the card entry device 28, but rather a software component that acts as a card entry device. For example, a payment screen at an Internet storefront might act as a card entry device.

The card entry device 28 of various embodiments receives payment data from any payment medium. The payment medium may be a payment card, electronic chip, radio frequency identification (RFID) device, or the like. The payment data may be data encoded on a magnetic strip on the back of a card, data stored in an electronic chip, data stored in an RFID device, or any other form of stored data. As discussed below with respect to FIG. 8, the payment data may include track data stored on the back of a payment card.

The payment data may also include a personal account number (PAN), personal identification number (PIN), expiration date, cardholder name, and/or a card security code, e.g., a three-digit code commonly found on the back of payment cards. In addition, the payment data might include an electronic cardholder signature or biometric data, such as a digital fingerprint. The payment data may also include a dynamic security code, such as may be found in a radio frequency identification (RFID) device embedded in a payment card. Many other forms of payment data may also be provided.

The card entry device 28 passes the payment data to the host computer 34. In one embodiment, the card entry device 28 is connected to the host computer 34 through a link 32. The link 32 is typically a cable, serial (e.g., RS232 or USB), parallel, Ethernet, or other hardware interface. Alternatively, the link 32 is not provided and the card entry device 28 is integral with the host computer 34. In another embodiment, the link 32 is a software interface, such as a network socket, or some combination of hardware and software.

The host computer 34 may be implemented as a cash register or may be connected with a cash register. Typically, the host computer 34 is or comprises a general purpose computer (e.g., a PC). The host computer 34 receives payment data from the card entry device 28, processes the data, and transmits authorization requests to the POS server 36. When the POS server 36 transmits authorization responses to the host computer 34, the host computer 34 displays the response to the cardholder and processes a payment transaction.

The host computer 34 in one embodiment runs an operating system (not shown), such as Windows, Linux, Unix, or the like. The host computer 34 also includes the POS terminal application 38 and the POS security layer (PSL) 40. In certain embodiments, the POS terminal application 38 and the PSL 40 are software components, which may be implemented as scripts, executable programs, interpreted bytecode, or the like.

In one implementation, the PSL 40 is a low-level application relative to the POS terminal application 38. For example, the PSL 40 preferably has priority over the POS terminal application 38 to access operating system routines and data. In addition, the PSL 40 is preferably capable of intercepting data intended for transmission to the POS terminal application 38, such as payment data. The PSL 40 may run as an operating system process.

The PSL 40 in one implementation is a script running at a sufficiently low level on the host computer 34 to capture the payment data prior to the POS terminal application 38 receiving the payment data. In one embodiment, the PSL 40 captures the payment data by monitoring and/or accessing an input buffer in the card entry device 28 or in the host computer 34. The PSL 40 may also be at a sufficiently low level to prevent malicious programs, such as keyloggers, packet sniffers, spyware, and viruses from obtaining the payment data. In addition, the PSL 40 encrypts the payment data and transmits the encrypted payment data to the POS server 36.

The POS terminal 30 communicates with the POS server 36 through a network 42. The network 42 may include cables, routers, switches, and other network hardware. In addition, the network 42 may be a wireless network, having wireless routers, access points, and the like. In one embodiment, the network 42 is the same or similar to the network 12 used in the prior art system of FIG. 1. However, in addition to the network 12, the network 42 is made secure by the addition of a secure channel 44. In one implementation, the POS terminal application 38 and the POS server application 46 communicate over a non-secure channel in the network 42, and the PSL 40 and a server security application (SSA) 48 residing on the POS server 36 communicate over the secure channel 44. The channel 44 is secure in various implementations because encrypted data is transmitted between the PSL 40 and the SSA 48 over the channel 44.

The POS server 36 is a computer system that receives authorization requests from one or more POS terminals 30 and transmits the authorization requests to a remote server, e.g., a gateway 52 over the Internet 18, a wide area network (WAN), a local area network (LAN), or a leased line. The POS server 36 therefore acts as an interface between the POS terminal(s) 30 and the gateway 52. The POS server 36 may be located at a merchant's place of business. Alternatively, the POS server 36 is located at a remote data center, which may be owned or leased by the merchant.

In addition to performing authorizations, the POS server 36 of certain embodiments also performs settlements. At the close of business or the next morning prior to opening, the merchant, using the POS server 36, submits all of its authorized transactions to the remote server (e.g., gateway 52). This group of transactions is typically referred to as a batch settlement. By issuing a settlement, the POS server 36 enables the merchant to receive payment or a credit for payment on the day's authorized credit card transactions, including transactions with debit cards used as credit cards. In some embodiments, where debit cards are processed as debit, the merchant receives payment from the bank without using a batch settlement. When the payment cards are gift cards, settlement is also often not used.

As shown in the depicted embodiment of FIG. 2, the POS server 36 includes a POS server application 46 and the SSA 48. In certain embodiments, the POS server application 46 and the SSA 48 are software components, which may be implemented as scripts, executable programs, interpreted bytecode, or the like.

In one implementation, the POS server application 46 is a high-level application relative to the SSA 48. For example, the SSA 48 may have priority over the POS terminal application 46 to access operating system routines and data. In another embodiment, the SSA 48 may be capable of intercepting data intended for transmission to the POS server application 46. In still other embodiments, the SSA 48 runs as an operating system process. Alternatively, the SSA 48 is not a lower-level application than the POS server application 46.

The SSA 48 of certain embodiments replaces a preexisting communications component or is a modification thereof. As a communications component, the SSA 48 in one implementation sends and receives authorization requests and settlements to a remote server, such as a gateway. Because the SSA 48 acts as the preexisting communications component, the POS server application 46 may communicate with the SSA 48 as if the SSA 48 were the preexisting communications component. The SSA 48 of certain embodiments therefore advantageously enables the POS server application 46 to send false payment data to the SSA 48 without any modification to the POS server application 46.

The SSA 48 and the PSL 40 may monitor each other to validate product versions and to ensure that the system has not been tampered with. This monitoring arrangement inhibits a thief or malicious code from altering the SSA 48 or PSL 40 to divert, for example, payment data to third parties.

In one embodiment, the PSL 40 encrypts the intercepted payment data and sends the encrypted payment data to the SSA 48 over the secure channel 44. The SSA 48 decrypts the encrypted payment data and creates false payment data by replacing all or a portion of the payment data with false data. The SSA 48 re-encrypts the payment data and stores the encrypted payment data on the POS server 36. Thereafter, the SSA 48 transmits the false payment data to the PSL 40 through the secure channel 44. The PSL 40 then provides the false payment data to the POS terminal application 38 in place of the actual payment data. The POS terminal application 38 processes the false payment data as if it were real payment data, providing the false payment data to the POS server application 46 over the non-secure channel 42 as part of an authorization request. Alternatively, the POS terminal application 38 provides the false payment data to the POS server application 46 over the secure channel 44. However, even when the POS terminal application 38 sends the false payment data over the non-secure channel 42, the system is still secure as no actual payment data is stored in a database 50.

In alternative embodiments, the PSL 40, rather than the SSA 48, creates the false payment data. The PSL 40 in such embodiments then sends the false payment data over the secure channel 44 to the SSA 48.

The POS server application 48 also processes the false payment data as if it were real payment data. Consequently, the POS server application 48 stores the false payment data in the database 50 rather than the actual payment data. Likewise, log data commonly maintained by the POS server application 46 also includes false payment data rather than actual payment data. Thus, in certain embodiments, no actual payment data is stored at the point of sale (or is stored only temporarily at certain points in the authorization process and deleted thereafter). Even if the false payment data includes a portion of the actual payment data (see FIG. 8), no complete actual payment data is stored at the point of sale.

The POS server application 46 transmits the false payment data to the SSA 48. The SSA 48 in an embodiment then combines the false payment data with the encrypted payment data and transmits the combined false and actual payment data over the Internet 18, leased line, or other network to the remote server (e.g., gateway 52) as part of an authorization request. The SSA 48 in another embodiment sends only the actual payment data or only the false payment data to the gateway 52. Moreover, the SSA 48 may send the actual payment data and the false payment data to the gateway 52 in separate transmissions. In one embodiment, the SSA 48 thereafter deletes all re-encrypted payment data. Alternatively, the SSA 48 waits for a response from the gateway 52 prior to deleting the re-encrypted payment data.

The gateway 52 in one embodiment includes one or more computer systems acting as servers (or acting collectively as a server), remote from the POS server 36. In various embodiments, the gateway 52 is maintained by an application service provider (ASP), which provides application services and data storage for merchants. The gateway 52 may also be maintained by a card processor, card association, issuing bank, or other entity. For instance, the gateway 52 may be used as a card processor server, such that the POS server 36 communicates directly (or through one or more intermediaries) with the card processor. In some implementations, the gateway 52 communicates with the POS server 36 through a leased line or wide area network (WAN), and thereby acts as a demilitarized zone (DMZ) between the merchant network, including the POS terminals 30 and POS server 36, and the outside world. The gateway 52 in these implementations therefore adds an additional layer of security from outside attacks. The gateway 52 may also communicate with an authorizing entity using a leased line.

A gateway security layer (GSL) 56 residing on the gateway 54 separates the combined false payment data and re-encrypted payment data received from the POS server 36. The gateway security layer 56 decrypts the re-encrypted payment data and passes the payment data to a gateway application 54, which in an embodiment (e.g., when the gateway 52 is not maintained by a card processor) transmits the payment data to a card processor for authorization. Alternatively, the gateway application 54 transmits the re-encrypted payment data, or in another embodiment, encrypts the payment data with a different encryption scheme. Upon receiving a response to the authorization request, the GSL 56 transmits the authorization response along with the false payment data to the POS server 36. By providing the false payment data to the POS server 36, the GSL 56 enables the POS server 36 to identify the authorization response with the correct payment card (as represented by the false data), without providing the actual payment data.

Because the false payment data is identified with a specific payment card, the false payment data may be used as a token for an additional transaction with the same payment card, such as an incremental authorization or settlement, as described in further detail below with respect to FIG. 9. When an additional transaction using a payment card is requested by the POS server 36, the POS server 36 can send the token corresponding to that payment card to the gateway 52 to perform the additional transaction. The gateway 52 matches the token with the actual payment data stored at the gateway 52 in order to request authorization or settlement from an authorizing entity. Instead of returning the false payment data as a token, however, the GSL 56 of some embodiments can also return a different set of false data as a token. This false data in some instances may be a portion or derivative of the false payment data.

The gateway 52 also facilitates the performance of batch settlements in certain embodiments. In one instance, the POS terminal 30 sends end-of-day transaction information to the SSA 36, requesting settlement. The SSA 36 transmits the false data corresponding to the end-of-day transaction information to the gateway 52. The gateway 52 uses components of the false data to update final transaction amounts to be settled.

Thus, it can be seen that at various points of vulnerability in the POS system of FIG. 1, the payment data is secured. For instance, the PSL 40 prevents the POS data from being sent in clear form to the POS terminal application 38. In addition, the PSL 40 transmits an encrypted version of the data over a secure channel 44 to the SSA 48. The SSA 48 secures transaction data and log data stored in the database 50 by using false data and thus little or no cardholder data is stored on the database 50. Moreover, the GSL 46 secures transactions by storing actual payment data at a secure location and by transmitting false payment data or token data back to the POS server 36. Consequently, opportunities to improperly obtain payment data are reduced or eliminated entirely.

Figure 3:
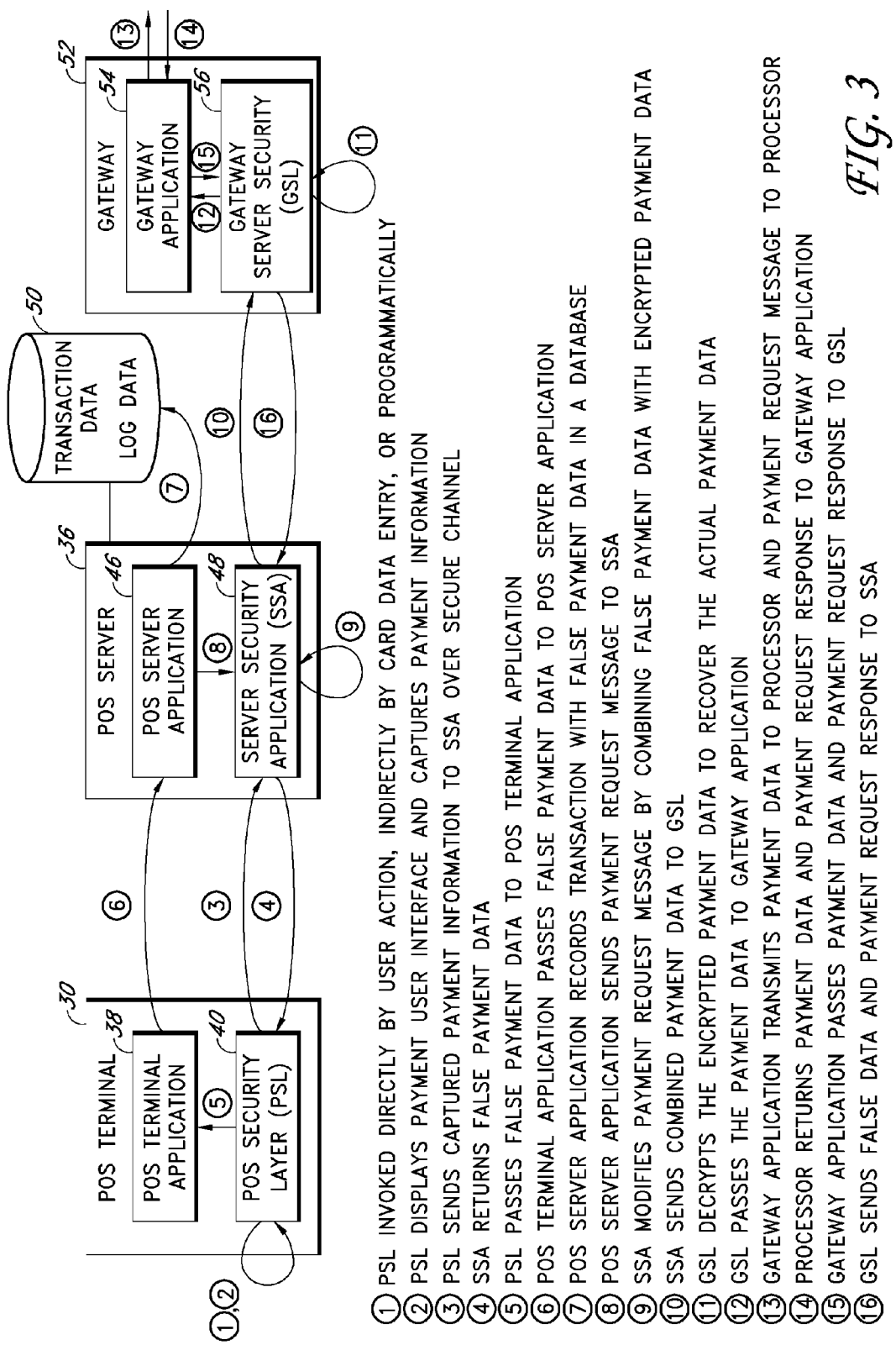
FIG. 3 is an exemplary process-flow diagram illustrating an embodiment of a payment card authorization process.

FIG. 3 illustrates the above-described card authorization process according to one embodiment. At step 1, the PSL 40 is invoked directly by a user action, indirectly in response to payment data entry, or programmatically, e.g., by another program such as the POS terminal application 38. In one embodiment where the PSL is invoked directly by user action, a hot key is used to invoke the PSL. The hot key may be located on the POS terminal 24 or on a card entry device such as the card entry device 28 of FIG. 2. The hot key may be a key on a keyboard, pin pad, computer screen, or touchscreen. In one embodiment, the hotkey is a "debit" or "credit" key on a pin pad, pressed by the cardholder. In another embodiment, the hotkey is a payment card key pressed by an employee of the merchant.

Additionally, the user action may include the use of a manual entry card, which is a card used by an employee of the merchant and is configured to enable the customer to manually enter payment data through a pin pad, keyboard, or the like. The use of a manual key card is described in greater detail below in connection with FIGS. 5-6.

In embodiments where the PSL 40 is invoked indirectly by a payment data entry event, the payment data entry event may include a card swipe or manual entry of payment data performed by a cardholder (e.g., a customer) or by an employee of the merchant. In an embodiment where the PSL 40 is invoked programmatically, the POS terminal may make a function call by, for example, using a dynamic-linked library (DLL), which invokes the PSL 40.

In step 2, the PSL 40 displays a payment user interface (display screen) on the display of the card entry device 28. The payment user interface in one embodiment is displayed in place of a preexisting payment user interface associated with the POS server application 46. The payment user interface in one embodiment is a substitute payment screen, which enables a user (e.g., cardholder or employee of the merchant) to provide payment data directly to the PSL 40. The substitute payment screen may also provide peace of mind to the user by displaying a message describing that the payment data is secure. In an alternative embodiment, the substitute payment screen is hidden from the user and is therefore transparent to the user.

The payment user interface of some embodiments pops over or otherwise overlays or replaces the preexisting user interface. The payment user interface may have a similar look and feel to the preexisting user interface, or the payment user interface may have a different look and feel. In other embodiments, the payment user interface is the preexisting user interface rather than a substitute payment user interface.

The PSL 40 also captures payment data provided by the cardholder. The PSL 40 of certain embodiments intercepts the payment data and prevents other programs from accessing the data. By capturing the payment data prior to other programs capturing the data, the PSL 40 in various implementations acts as a keylogger.

In one embodiment, the PSL 40 is a hook-based keylogger, e.g., a keylogger that uses operating system routines (e.g., the SetWindowsHookEx API (application programming interface) in Windows implementations) to capture incoming data. Similarly, the PSL 40 may use other operating system routines (e.g., the GetKeyboardState API in Windows implementations) to obtain keystrokes prior to the keystrokes being received by any active window. Alternatively, the PSL 40 may be a kernel-based keylogger, receiving input/output (I/O) requests that are sent to the input device driver (e.g., the card entry device 28). In one such embodiment, the PSL 40 employs a device-level driver that sits above the keyboard driver (e.g., between the input device driver and other operation system functions or applications), and hence is able to intercept I/O requests. Moreover, the PSL 40 may also be a handle injection keylogger by injecting characters into a window and thereby bypassing the input device. As a keylogger, the PSL 40 captures pin pad keystrokes, keyboard keystrokes, track data, signature data, biometric data, and the like. Capturing this data allows the PSL 40 to prevent malicious programs from accessing the data and also allows the PSL 40 to prevent the data from reaching the POS terminal application 38. Thus, the PSL 40 of certain embodiments increases the security of the POS terminal 30.

Turning to step 3, the PSL 40 transmits the captured payment data to the SSA 48 over a secure channel. In one embodiment, the channel is secure due to an encryption scheme performed by the PSL 40 on the payment data. The encryption scheme may include a mixed public/private key (asymmetric/symmetric key), a public key, a private key, or another encryption scheme. In one embodiment, an IPSEC or PKI protocol is used in the encryption scheme. One example implementation of the encryption scheme includes a mixed public/private key stored in real-time, in random-access memory (RAM). The encryption and decryption may be dynamic in nature, in that the encryption scheme may create a new public/private key pair each time the SSA 48 is started. In addition, the keys in the encryption scheme may be implemented using one or more encryption algorithms. For instance, a blowfish algorithm, twofish algorithm, a 3DES (Triple Data Encryption Standard) or AES (Advanced Encryption Standard) algorithm, or other algorithm may be used to encrypt the payment data at the PSL 40.

The SSA 48 in one embodiment decrypts the encrypted payment data and returns false payment data to the PSL 40 in step 4. Alternatively, the SSA 48 does not decrypt the payment data. The SSA 48 generates false payment data such that the POS terminal 30 and the POS server 36 will be able to process the false payment data as if it were real payment data. In one embodiment, the SSA 48 generates the false payment data using a random-number generator. In another embodiment, the SSA 48 generates the false payment data sequentially. For example, a personal account number (PAN) from a first payment card may be replaced with numbers from a sequence of false data, and a second PAN may be replaced with successive numbers in the sequence of false data. A more detailed example of false data is described below with respect to FIG. 8.

The SSA 48 reencrypts the payment data or provides additional encryption to already encrypted payment data. The SSA 48 stores the encrypted payment data on the POS server 36. In some implementations, the SSA 48 provides additional encryption even when the payment data is already encrypted because the SSA 48 can be used without the PSL 40 to process transactions from the POS server 36 and/or POS terminal 30. In such circumstances, it may be desirable to encrypt any data transmitted from the SSA 48 over a public network. Additionally, other non-public information that may already exist in the POS server 36 may be encrypted and sent to a data center using the SSA 48. Depending on the merchant, this information might include pre-registered information such as Social Security numbers, medical patient IDs, addresses, and the like.

In one embodiment, the SSA 48 provides two types of encrypted payment data, including an "undecryptable" version and a decryptable version. The undecryptable version is decryptable at the gateway 52 but not at the merchant location (e.g., at the POS terminal 30 or POS server 36), and the decryptable version is decryptable at the merchant location. As described more fully below in connection with FIG. 7, the undecryptable version may be used to process credit transactions and offline debit transactions, and the decryptable version may be used to process online debit transactions. However, in alternative embodiments, such as when online debit transactions are not used by the merchant, the SSA 48 provides only an undecryptable version of the payment data. Moreover, in still other embodiments, the PSL 40, rather than the SSA 48, provides the undecryptable and decryptable versions of encrypted payment data when the PSL 40 originally encrypts the payment data. In one such embodiment, the SSA 48 provides additional encryption to the already-encrypted payment data. In addition, the SSA 48 may generate false payment data without knowing the contents of the actual payment data.

In step 5, the PSL 40 passes the false payment data to the POS terminal application 38. The POS terminal application 38 receives the false payment data as if it were the real payment data. Because the POS terminal application 38 has only false payment data, malicious software and hardware in communication with the POS terminal 30 cannot access the actual payment data.

In step 6, the POS terminal application 38 passes the false payment data to the POS server application 46 on the POS server 36 typically over a non-secure channel as part of an authorization request. Because false data is used, the payment data is made secure.

In step 7, the POS server application 46 records the transaction with the false payment data in the database 50. The transaction data may include the false payment data along with information regarding purchase price, items purchased, and the like. The transaction data is used in some applications for generating reports, generating batch settlements, and for processing incremental or authorizations (see FIG. 9 below). In addition, the POS server application 46 stores log data in the database 50. The log data may include a subset or all of the transaction data and may also include additional data. The log data may be used to provide access to a technician for troubleshooting the POS terminal 34 or the POS server 36. Because false transaction and log data are stored in the database 50, the payment data is secure.

In step 8, the POS server application 48 sends a payment or authorization request message to the SSA 46. Thereafter, in step 9 the SSA 46 modifies the payment request message by combining the false payment data with the re-encrypted payment data. The SSA 48 then sends the combined payment data to the gateway security layer (GSL) 56 in step 10.

At the gateway 52, the GSL 56 then decrypts the encrypted payment data in step 11 to recover the actual payment data. The GSL 56 in step 12 then passes the actual payment data to the gateway application 54. Alternatively, the GSL 56 reencrypts the data prior to sending the data to the gateway application 54. In another embodiment, the GSL 56 does not decrypt the encrypted data received from the POS server 36, but instead passes the encrypted data to the gateway application 54. In step 13, the gateway application 54 then transmits the payment data to a card processor, which is an intermediary in eventually obtaining an authorization response from a central location such as an issuing bank.

The processor returns the payment data and a payment request response to the gateway application 54 in step 14. The gateway application 54 passes the payment data and payment request response to the GSL 56 in step 15. Thereafter, the GSL 56 sends the false payment data, rather than the actual payment data, along with the payment request response to the SSA 48. By sending the false data, the GSL 56 enables the SSA 48 to identify the payment request response with the correct payment card without sending the actual payment data to the SSA 48.

Figure 4:
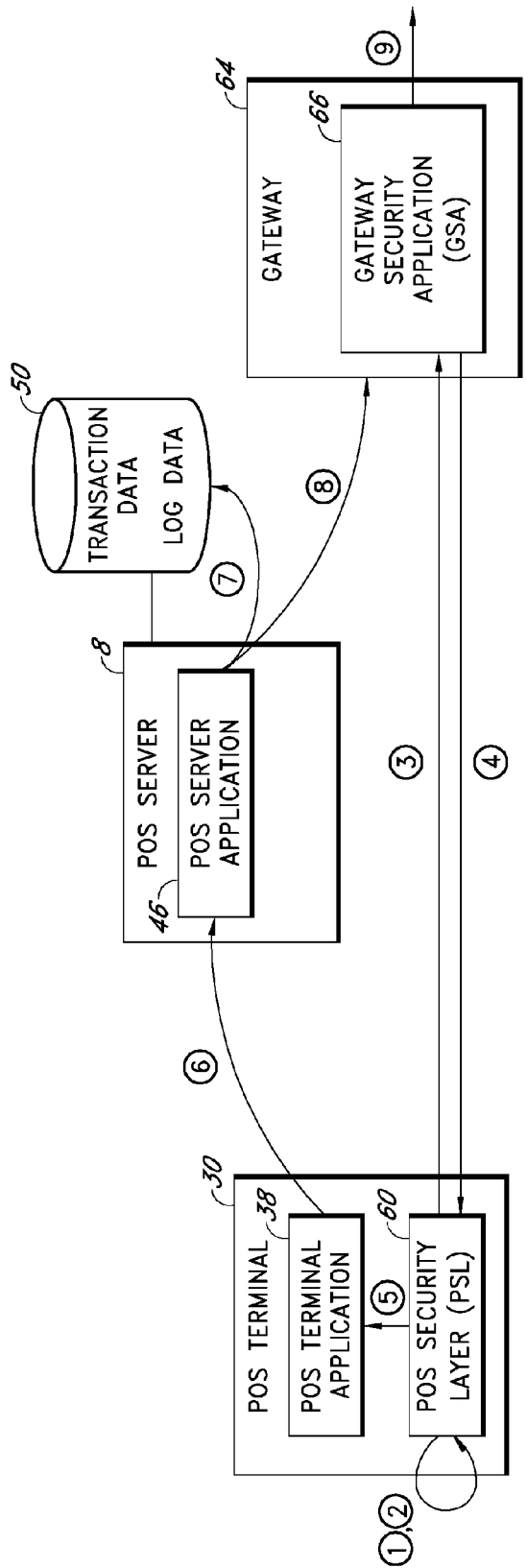
FIG. 4 is an exemplary process-flow diagram illustrating another embodiment of a payment card authorization process.

Turning to FIG. 4, an alternative process flow for processing payment card transactions is depicted. This alternative process flow might be used, for example, with legacy POS terminals 30 that have a direct communications interface (e.g., not via an SSA or the like) to a particular gateway or processing platform (e.g. a bank's proprietary front end). In the alternative process flow of FIG. 4, a POS terminal 30 is in communication with a gateway 64 and a POS server 8. In addition, a database 50 is in communication with, or maintained on, the POS server 8. At step 1, the PSL 60 is invoked directly by a user action, indirectly in response to payment data entry, or programmatically, e.g., in a similar manner as described with respect to FIG. 3 above.

Thereafter, in step 2 the PSL 60 displays a payment user interface and captures the payment information. In step 3, the PSL 60 sends the captured payment information to a gateway security application 62 over a secure channel, which may be the Internet, a leased line, or other network. In one embodiment, the PSL encrypts the data prior to transmission, thereby securing the channel.

In step 4, the GSA 66 returns false payment data to the PSL 60. Consequently, no actual payment data is stored on the POS terminal 34 or the POS server 8. However, if an online debit transaction is used, the GSA 66 may also provide a decryptable version of the payment data to enable the POS terminal 30 to process the online debit transaction. In the alternative, the PSL 60 uses a decryptable version of the payment data to process the online debit transaction. The PSL 60 in step 5 passes the false payment data to the POS terminal application 38. The POS termination application 38 processes the false payment data as if it were actual payment data.

The POS terminal application 38 then in step 6 passes the false payment data to the POS server application 14. In step 7, the POS server application 14 records the transaction with the false payment data in the database 50. Because false payment data is stored in the database 50, the payment data is less vulnerable to theft.

Thereafter, the POS server application 14 in step 8 sends a payment request or authorization request message to the gateway 64 using the false payment data. The gateway security application 66 in step 9 transmits the actual payment data and a payment request message to a processor. Thus, except when the encrypted actual payment data is transmitted to the GSA 66, only false payment data is used in the authorization transaction. Finally, the gateway receives the payment data and the payment request response from the processor and forwards the response on to the POS server application 46.

Certain components described in the alternative process flow may be provided to a preexisting non-secure POS system to secure the POS system. In one embodiment, the PSL 40 is provided to augment or retrofit a preexisting POS system. In addition, the GSA 66 may be provided to replace or to augment a preexisting gateway 64. However, in the depicted embodiment, no component is added to augment the preexisting POS server 8. Advantageously, fewer components are therefore used to secure the POS system in the alternative process flow of FIG. 4.

Figures 5, 6:
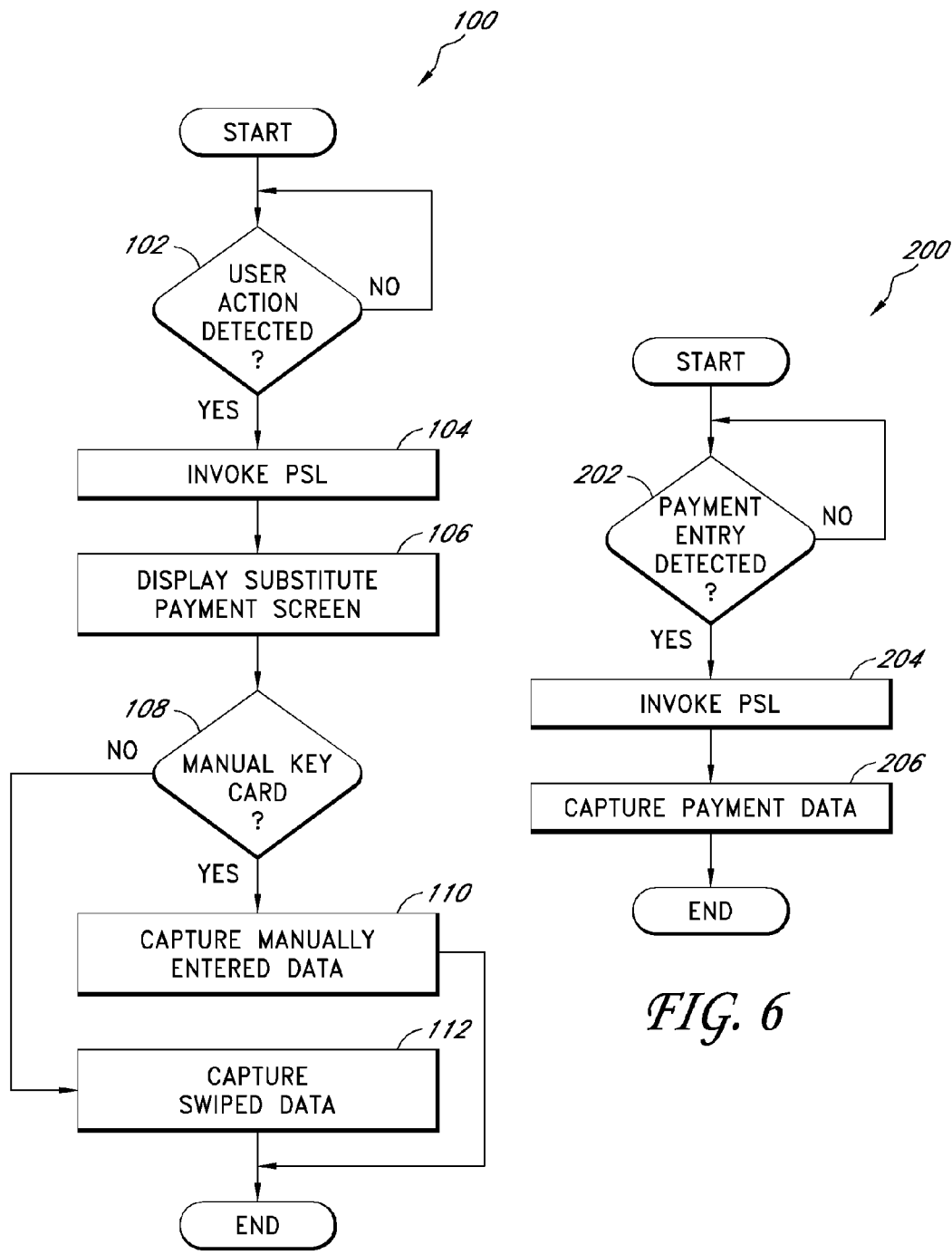
FIG. 5 is an exemplary flowchart diagram illustrating an embodiment of a process for invoking a security component.
FIG. 6 is an exemplary flowchart diagram illustrating another embodiment of a process for invoking a security component.

FIGS. 5 and 6 illustrate various embodiments for invoking a PSL and capturing payment data. FIG. 5 depicts a method 100 for directly invoking a PSL and capturing payment data. FIG. 6 depicts a method 200 for indirectly invoking a PSL and capturing payment data. The methods 100, 200 may be performed by any of the POS terminals described above, and as part of the process of FIG. 3 or FIG. 4.

Referring to FIG. 5, at 102, the method 100 determines whether a user action has been detected. The user action may include, for example, a hotkey press or a manual key card swipe. If a user action has not been detected, the method 100 returns to 102. In one embodiment, the method at 102 therefore listens for the pressing of a hotkey, which may be a key on a keyboard, pin pad, a button on a computer or touch screen, or the like. The pressing of a hotkey may be, for example, the pressing of a "payment type" key on a pin pad of the card entry device.

If a user action was detected, the method 100 invokes the PSL at 104. In one embodiment, the PSL is resident in memory prior to the key press, listening for a user action, payment data entry, or program call (described below with respect to FIG. 6). In one such embodiment, the PSL is invoked by activating functions in the PSL that enable the capture of payment data. In an alternative embodiment, the PSL is invoked by being loaded into memory.

At 106, the method 100 displays a substitute payment screen. In one embodiment, the payment screen is a substitute payment screen displayed in place of an original payment screen supplied by a POS manufacturer. The substitute payment screen may have a similar look and feel to the original payment screen; however, payment data entered into the substitute payment screen is captured by the PSL. The substitute payment screen may also look different from the original payment screen or include fewer or more features than the original payment screen. The substitute payment screen enables entry of payment data directly into the PSL.

The method 100 continues at 108 by determining whether the user action included the entry of a manual key card. The manual key card in one implementation is a card used by an employee of the merchant to prepare the POS terminal for receiving manual entry data. Manual entry data includes payment data typed into a keyboard, PIN pad, or the like, which may be entered if the card swipe reader is not working or is not available to the cardholder, such as in online or telephone catalog transactions. If the user action included use of a manual key card, the method 100 proceeds to capture the manually-entered data at 110. Otherwise, if another user action was used, the method 100 proceeds to capture swiped data of the payment card at 112.

In another embodiment, manual entry of payment data may be done without using a manual entry card. For example, in one embodiment, a cardholder invokes the PSL through a hotkey press and manually enters the payment data in the substitute payment screen.

Referring to FIG. 6, the method 200 determines whether payment data entry has been detected at 202. If payment data entry has not been detected, the method 200 returns to 202. In one embodiment, the method at 202 therefore listens for payment data entry, which may include a card swipe, manual entry of payment data, or the like. The payment data entry may performed by a cardholder or employee of the merchant in various embodiments.

If payment data entry was detected, the method 200 invokes the PSL at 204, which captures the payment data at 206. In one embodiment, the PSL is resident in memory prior to the payment data entry, listening for a user action (see FIG. 5) or payment data entry. In one such embodiment, "invoking" the PSL means to activate the PSL to enable the PSL to capture the payment data. In an alternative embodiment, the payment data entry invokes the PSL by causing the PSL to be loaded into memory.

In one embodiment, a substitute payment screen is not used to capture the payment data because the payment data entry provided the payment data. In an alternative embodiment, the substitute payment screen is also displayed in the method 200. In one such embodiment, the substitute payment screen enables the cardholder to enter PIN data, signature data, biometric data, or the like.

While not shown in FIG. 6, the PSL may also be invoked by a program call. In one such implementation, a software component on the POS terminal may make a function call by, for example, using a dynamic-linked library (DLL), which invokes the PSL.

Figure 7:
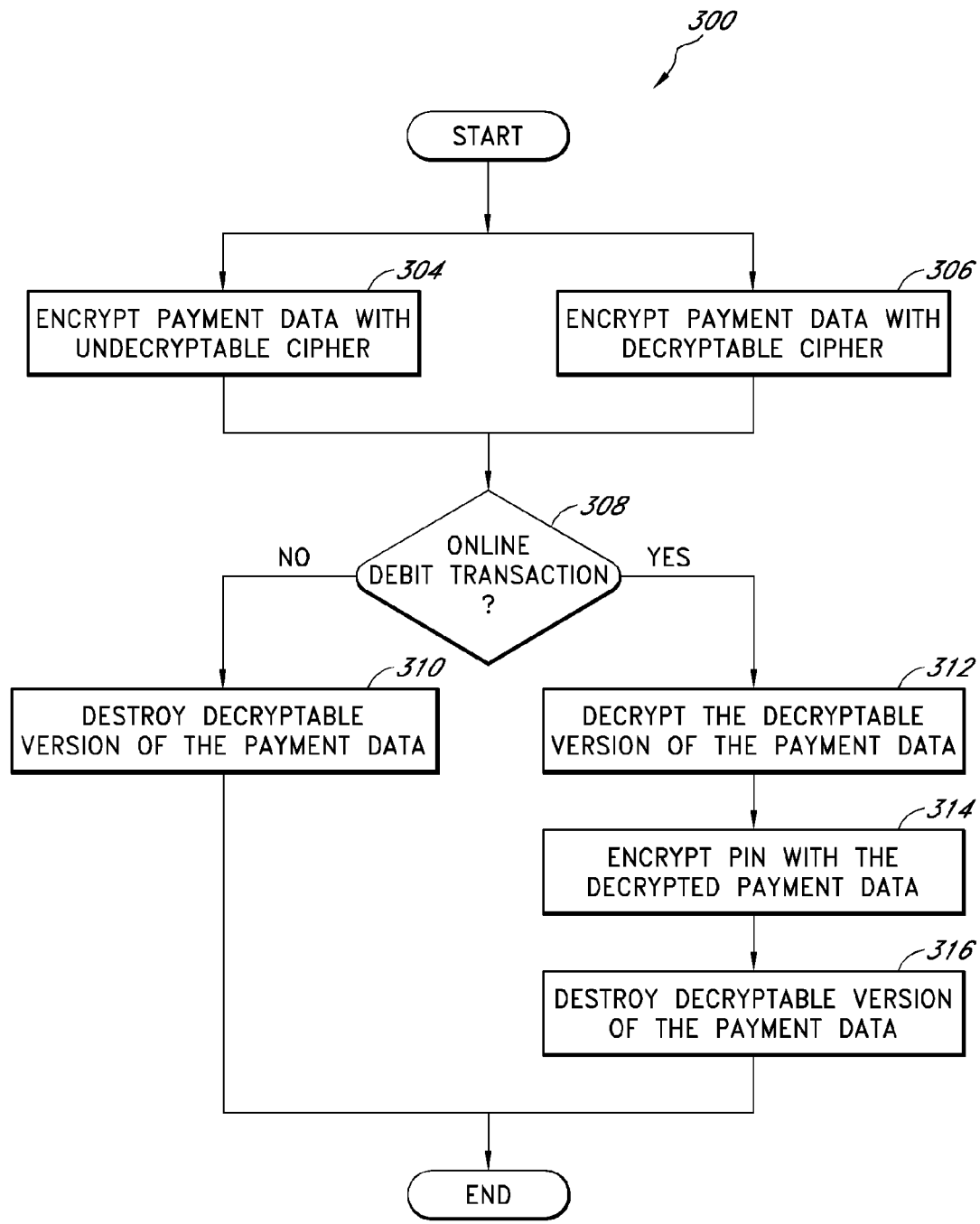
FIG. 7 is an exemplary flowchart diagram illustrating an embodiment of a process for encrypting payment data.

FIG. 7 is a flowchart diagram illustrating an embodiment of a method 300 for encrypting payment data. The method 300 may be performed by any of the POS systems described above and as part of the process of FIG. 3 or 4. In particular, the method 300 is performed by the SSA in one embodiment. Advantageously, the method 300 enables online debit transactions to be secured. In some implementations, the term "online debit" denotes using a PIN to complete a debit transaction, and the term "offline debit" refers to using a signature to complete a debit transaction. Online debit is often referred to colloquially as a "debit" transaction, and "offline debit" is often referred to as a "credit" transaction.

At 304, the method 300 encrypts payment data with an "undecryptable" cipher. In one embodiment, the data is undecryptable at the point of sale, e.g., at the POS terminal or POS server. However, the data may be decrypted at a gateway or other remote server.

At 306, the method 300 encrypts the payment data with a decryptable cipher. In one embodiment, the data is decryptable at the point of sale, e.g., at the POS terminal or POS server. The method 300 in one implementation encrypts the data with the decryptable cipher at the same time or substantially the same time as the method 300 encrypts the data with the undecryptable cipher.

The method 300 next determines whether an online debit transaction is taking place at 308. If the transaction is not online debit (e.g., it is an off-line debit, credit, or gift card transaction), the method 300 destroys the decryptable version at 310. If, however, the transaction is online debit, the method 300 proceeds to decrypt the decryptable version of the payment data at 312. The decryptable version is destroyed by the SSA, although in alternative embodiments, the PSL performs this function. Thereafter, the method 300 encrypts the PIN using the decrypted payment data to create an encrypted PIN block at 314. Once the encrypted PIN block is created, the method 300 destroys the decryptable version of the payment data at 316. As before, the decryptable version is destroyed by the SSA, but the PSL may also perform this function. In addition, in an alternative embodiment, the method 300 may be applied to a credit card, gift card, or other card having a PIN, rather than a debit card.

One example implementation of the method 300 is as follows. An SSA encrypts payment data received from a PSL with an "undecryptable" cipher at 304 and a decryptable cipher at 306. The SSA determines whether the transaction is online debit at 308. If the transaction is not online debit, the SSA deletes the decryptable version of the data at 310. The SSA may delete the data upon detecting a non-online debit transaction, or the SSA may employ a time-out period (e.g., 30 seconds), after which the decryptable version will be automatically destroyed. In addition, the decryptable version may be stored in volatile memory (memory that erases on power-down), such as in random access memory (RAM). In one embodiment, the time-out period is adjusted to balance transactional reliability with security. Alternatively, the SSA determines that the transaction is online debit and sends the decryptable version to the PSL, which decrypts the decryptable version of the payment data at 312. The PSL then provides the decrypted payment data to the pin pad, which at 314 encrypts the PIN using some or all of the payment data (e.g., the PAN or full track data). Once the PIN is encrypted or after a time-out period, the SSA destroys (permanently deletes the only copy of) the decryptable version of the payment data stored on the POS server at 316. In addition, if a copy of the decryptable version is stored on the POS terminal, the PSL also destroys this data.

Some businesses do not accept online debit transactions or any debit transactions. In these businesses, the method 300 may be configured to provide only an undecryptable version of the payment data. Thus, there may be no need to store a decryptable version.

Turning to FIG. 8, various formats of payment data are shown, some or all of which are generated during the process flow described above under either of FIG. 3 or 4. FIG. 8 illustrates actual data 410, originally presented by the cardholder. This actual data 410 is encrypted by a PSL and becomes encrypted data 430. Thereafter, an SSA decrypts the encrypted data 430 and replaces the actual data 410 with false data 450. In addition, the SSA re-encrypts the actual data 410 to generate re-encrypted data 460. The SSA combines the false data 450 and the re-encrypted data 460 to create combined data 470, which the SSA transmits to a gateway.

The various formats of payment data shown are depicted as track data. The actual data 410 is contained in a magnetic swipe on the payment card. This magnetic swipe includes one or more "tracks" of data. Many debit and credit cards have three tracks of data, which are typically referred to as "track 1," "track 2," and "track 3." Of these tracks, track 2 is often used by vendors to obtain payment data from the payment card. An example of track 2 data is shown in FIG. 8 as actual data 310.

The actual data 310 includes a start sentinel 412, represented by a ";" character. The start sentinel 412 is used, for example, by parsing software to indicate the start of track 2 data. Following the start sentinel 412, a PAN 414 is shown.

The depicted PAN 414 includes 16 digits. In alternative embodiments, more or fewer digits are included in the PAN 414.

Following the PAN 414, a field separator 416 is shown, denoted by the "=" character. The field separator 416 enables parsing software to distinguish between the PAN 414 and data following the PAN 416. After the field separator 416, ancillary data 418 is shown. The ancillary data 418 may include the expiration date of the card, the PIN of the card, and other discretionary data determined by the card issuer. In the depicted embodiment, the first four digits of the ancillary data 418 are reserved for the card expiration date using the format YYMM ("0101"). An end sentinel 420 ("?") follows the ancillary data 418 to mark the end of the track.

In certain embodiments, track 1 data (not shown) is used instead of or in addition to track 2 data. One possible format of track 1 data might be the following: "% B PAN ^ Cardholder Name ^ Ancillary data ?". Like the track 2 data, the track 1 data includes start and end sentinels ("%" and "?"), one or more field separators ("^"), the PAN, and ancillary data. The track 1 data also includes a format code ("B"), which may vary, and the cardholder name. While the remainder of FIG. 8 describes a specific example using track 2 data, track 1 data may also be used interchangeably or with slight modifications. Likewise, though not shown, in some implementations track 3 data may also be used.

During the process flow described under FIGS. 3 and 4 above, the actual data 410 is encrypted by a PSL to generate encrypted data 430. The encrypted data 430 includes a block 432 of alphanumeric and/or symbolic representations of the actual data 410.

The encrypted data 430 is decrypted by the SSA, and the SSA replaces the actual data 410 with false data 450. In one embodiment, the false data 450 looks substantially similar to the actual data 410. Because the false data 450 is similar to (in the same format as) the actual data 410, a POS terminal and POS server can process the false data 450 as if it were the actual data 410 without being aware of processing false data 450. Thus, in one embodiment the false data 450 has a card-swipe compatible format.

In the depicted embodiment, the false data 450 is a modified version of the actual data 410. The false data 450 includes the same start and end sentinels 412, 420 and the same field separator 416. However, a PAN 452 of the false data 450 differs from the PAN 414 of the actual data 414. In addition, ancillary data 454 of the false data 450 differs from the ancillary data 418 of the actual data 410.

The PAN 452 of the false data 450 in one implementation retains the first four digits ("1234") and the last four digits ("3456") of the PAN 414 of the actual data 410. Between the first four and last four digits, the digits of the actual data 410 are replaced with false digits 456, e.g., "00000000" in the depicted example. In addition, the ancillary data 454 of the false data 450 includes false data in the depicted embodiment. In the depicted embodiment, this false data completely replaces the ancillary data 418 of the actual data 410. Alternatively, the ancillary data 454 does not include false data.

The false data 450 for a particular payment card is unique and distinct from other false payment data 450 corresponding to other payment cards. In one embodiment, this uniqueness is achieved by combining the false digits 456 between the first and last four digits of the PAN 452. In addition, the ancillary data 454 may be generated to provide unique false data 450.

The false digits 456 may be generated randomly. Alternatively, the false digits 456 are generated incrementally, where each successive payment card presented at the POS is provided a successive number in a sequence. For example, the false digits 456 may be incremented from 11111111 to 22222222 and so on down to 99999999. In addition, the false digits 456 may be generated from an algorithm which uses the date, time, and/or the origin of the transaction to derive a set of digits. In another implementation, the false digits 456 are generated according to another type of algorithm or a combination of the above-described algorithms. Likewise, the false ancillary data 454 may be generated randomly, sequentially, or algorithmically.

In another embodiment, the false data 450 is generated such that the false data 450 fails the Luhn Modulus 10 algorithm ("the Luhn test"), described in U.S. Pat. No. 2,950,048, titled "Computer for Verifying Numbers," which is hereby incorporated by reference in its entirety. The Luhn test detects a valid card number by performing a checksum of the digits of the card number. The false data 450 may therefore be generated such that a checksum of the digits of the false data 450 indicates that the false data 450 is an invalid payment card number. Consequently, the false data 450 in this embodiment cannot be used fraudulently as a valid card number.

The false data 450 may be generated to fail the Luhn test in a variety of ways. In one embodiment, false data 450 is first generated that passes the Luhn test. Then, the false data 450 is modified so that it no longer passes the Luhn test, e.g., by changing a digit in the false data 450. For example, if one of the digits in the false data 450 is a 5, the algorithm could replace the 5 with any of the numbers 0-4 or 6-9, causing the false PAN to fail the Luhn test.

In addition or as an alternative to the Luhn test, invalid ranges of card numbers may be used to generate the false data 450. For example, different ranges of invalid card numbers may be designated by different card associations (e.g., Visa, American Express, or the like); a false data generation algorithm may then be used which ensures that all false card numbers generated for a particular card type (e.g., Visa) fall within the corresponding invalid range. In one embodiment, at least a portion of the false data 450 is thus derived or selected from a range of invalid card numbers created by one or more card associations. For example, if a card association uses the range 4000000000000000 to 4999999999999999 for valid PAN numbers, at least a portion of the false data 450 could take on a number from 0000000000000000 to 3999999999999999 or from 5000000000000000 to 9999999999999999. Advantageously, false data 450 derived from these ranges in certain embodiments cannot be used for fraudulent authorizations. Moreover, in one implementation, the false data 450 may be derived from an invalid range of card numbers and also be generated to fail the Luhn test.

False data 450 generated to fail the Luhn test or generated from an invalid range of card numbers can be used beneficially as a token for additional transactions. In one embodiment, the false data 450 is used directly as a token, or alternatively, a token is derived from the false data 450. In one embodiment, the token includes three parts. These parts may include some portion of the first four digits of the PAN, followed by seven digits of false data, followed by the last four digits of the PAN. Because the token is an invalid card number, the token may be used in certain complex POS systems for additional or recurring transactions. In addition, this implementation of a token may allow greater flexibility for subsequent transaction processing, such that the token can be used to process subsequent transactions in a similar way to existing tokenization models.

Some POS terminals and/or servers may be changed to disable the use of the Luhn test in order to facilitate using false data 450 that fails the Luhn test. As some POS terminal and/or server manufacturers have the Luhn test enabled on a payment-type basis (e.g., credit card payment type, debit card payment type, or the like), this particular feature can be disabled for some or all payment-types accepted by a particular merchant. Thus, in various embodiments the false data 450 has a card-swipe compatible format that can be processed by the POS system, but the false data 450 is an invalid card number.

Because the first and last four digits of the PAN 414 are retained in the false PAN 452 in some variations, the combination of random, sequential, or algorithmically-defined digits and the first and last four digits of the PAN 452 will likely be unique from false data 450 generated for other payment cards. If a non-unique number is generated, in one embodiment the SSA re-generates the false data 450 until a unique number is found.

The false digits 456 may also be tied to a particular transaction. Thus, in one example, a single payment card used in multiple transactions may be assigned a unique set of false data 450 for each transaction. Alternatively, successive transactions use the same false data 450.

While one example of the false data 450 has been described, the false data 450 may be implemented in other ways. For instance, fewer or more than the first and last four digits of the actual PAN 414 may be retained, or additional portions of the ancillary data 418 may be retained. In addition, the ancillary data 418 may be falsified into false ancillary data 454 randomly, sequentially, or algorithmically. Moreover, in one embodiment, one or more of the start and end sentinels 412, 420 or field separator 416 are replaced with false data. In addition, although numerals have been used to represent false data, in one embodiment, the false data 450 includes false alphanumeric or symbolic characters.

The false data 450 or portions thereof (e.g., the false digits 456) cannot be transformed into the actual data 410 in some embodiments because it is generated by a random process, sequence, or algorithm that is not based on the actual data 410. Thus, the false data 450 of such embodiments bears little or no relation to the actual data 410. The false data 450 of such embodiments is correlated with the actual data 410 only by the SSA combining the false 410 and re-encrypted data 460 together for transmission to the gateway. Thus, when the SSA deletes the re-encrypted data 460 after transmission, only the gateway knows the actual data 410 and to which actual data 410 the false data 450 corresponds. Thus, the false data 450 of certain embodiments helps secure the POS system.

FIG. 8 also depicts the re-encrypted data 460. This data 460 is generated by the SSA after the SSA decrypts the encrypted data 430 received from the PSL. While only one block of data is shown, the re-encrypted data 460 may actually be two data blocks—one undecryptable data block and one decryptable data block (see FIG. 7). The two data blocks may have different values.

The SSA combines the false data 450 and the re-encrypted data 460 into combined data 470. The SSA may use either the undecryptable or decryptable data block to create the combined data 470. Although the combined data is formed by concatenation in this example, any method of combining the false 450 and re-encrypted data 460 may be used provided that the method is known to the gateway. The SSA provides the combined data 470 to the gateway, which decrypts the re-encrypted data 460 stored in the combined data 470 to recover the actual data 410. Though not shown, the gateway may also re-encrypt the actual 410 data in a format that is decryptable by the authorizing entity (e.g., issuing bank). The gateway may instead not decrypt the re-encrypted data 460, but rather pass the re-encrypted data 460 directly to the authorizing entity.

Figure 9:
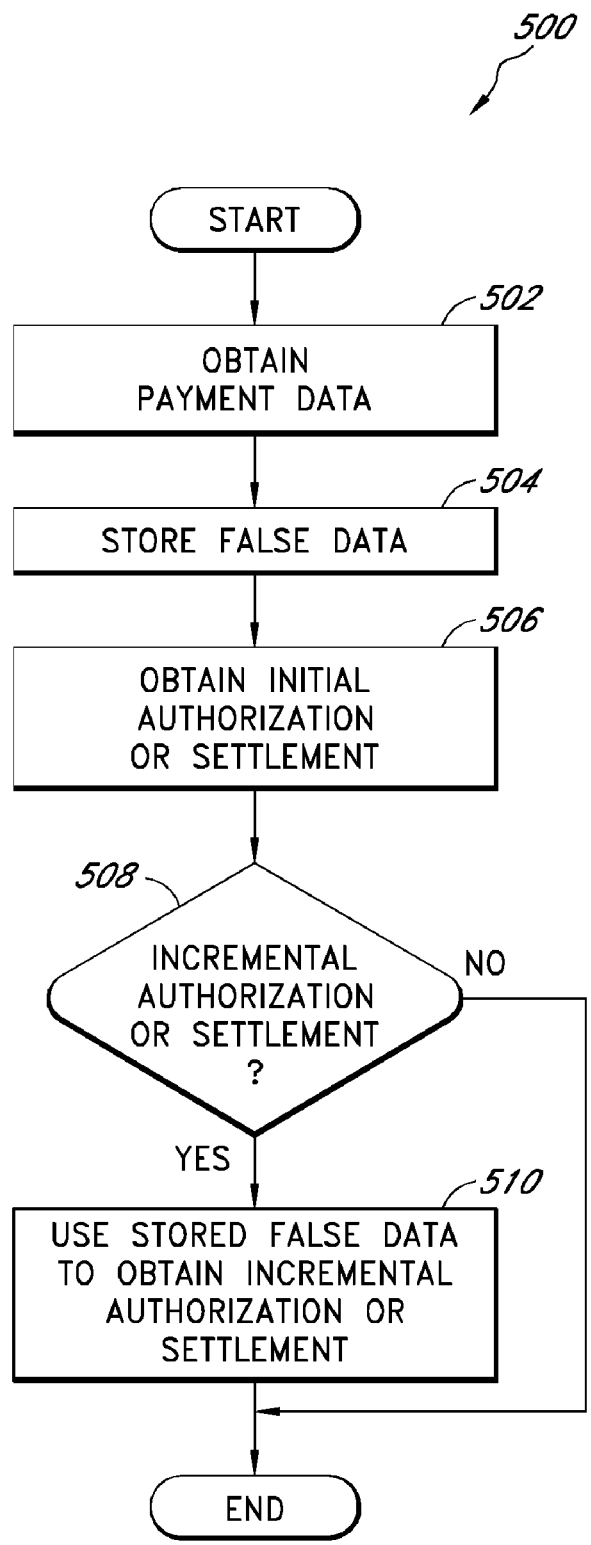
FIG. 9 is an exemplary flowchart diagram illustrating an embodiment of a process for performing incremental authorizations or settlements.

Turning to FIG. 9, embodiments of a method 500 for obtaining incremental authorizations or settlements are shown. Payment data is often used to perform incremental authorizations or settlements. For example, in the restaurant environment, the payment card is first authorized for the amount of the bill. However, frequently the merchant adds incremental charges, such as tips and tabs to the bill after the cardholder has left. In order to complete the incremental transaction, the merchant retains the payment data.

Similarly, in lodging and rental industries, incremental authorizations are used. For example, hotels and car rental businesses use payment card authorizations to make reservations. Storing payment data enables hotels and car rental businesses to charge multiple items to a single invoice. Hotel customers often want and expect the ability to charge items to their room from the gift shop, restaurant, spa, and the like. In some cases, it may not always be possible to ask the cardholder to present a card to cover the cost of incidentals. The cardholder may have already checked out, for instance, prior to the discovery of a depleted mini bar, or they may have said they would return a car tank full of gas, but in fact did not.

In addition, mail order, telephone order, and online businesses often operate using a "book and ship" model. In this model, the order is placed, but the credit card is not charged until the order is actually shipped. In these cases, payment data is retained until the order is shipped and the card is charged for the amount of the order. Moreover, merchants who charge monthly memberships, such as spas, clubs, and gyms, also store the payment data in order to process these monthly charges.

Accordingly, FIG. 9 illustrates a method 500 for obtaining incremental authorizations or settlements. At 502, the method obtains payment data. The payment data may be obtained, for example, by the PSL. The method 500 then stores false data 504 in place of the payment data. In one embodiment, the POS server application stores false data provided by the POS terminal application as if it were the real payment data. At 506, the method obtains an initial authorization or settlement 506 using the false data. This step may include the substeps of requesting an authorization or settlement using the POS terminal application and/or SSA, receiving the authorization or settlement with the gateway, and receiving the authorization or settlement response from the gateway at the SSA.

Thereafter, the method 500 determines at 508 whether an incremental authorization or a settlement is to be performed. In one embodiment, this determination is made by the POS terminal application. If there is no such authorization or settlement, the method ends. Otherwise, the method 500 uses the stored false data at 510 to obtain an incremental authorization or delayed settlement by using, for instance, the SSA to request the authorization or settlement. Because the method 500 uses false data to perform the additional authorizations or settlements, sensitive payment data does not need to be stored at the merchant location to perform additional authorizations or settlements. As a result, the method 500 increases the security of payment card transactions.

In addition to the embodiments described above, some or all of the various systems and methods described herein may be employed with an online store over the Internet. For example, the point of sale may include a shopping cart program at the online store, and the online store may process all or a portion of a transaction using false data. Moreover, at least a portion of the systems and methods described herein may be implemented at a telephone call center. For instance, an operator may take payment data from a purchaser over the telephone and enter the payment data into a secure POS terminal, which performs all or a portion of the transaction using false data.

Moreover, although the POS terminal and the POS server have been described as separate devices, in certain embodiments the POS terminal and the POS server are a single physical device, or the functions of the POS terminal and server are performed by a single device. As a result, in one embodiment some or all of the functions of the POS terminal and server are implemented, except that no network is used to communicate between the POS terminal and server. Additionally, some or all of the functions of the POS terminal may be performed by the POS server, and vice versa. Other implementations may also be employed, as will be understood by those of skill in the art.

Those of skill will further appreciate that the various illustrative logical blocks, modules, components, and process steps described in connection with the embodiments disclosed herein may be implemented as electronic hardware, computer software, or combinations of both. To clearly illustrate this interchangeability of hardware and software, various illustrative components, blocks, components, and steps have been described above generally in terms of their functionality. Whether such functionality is implemented as hardware or software depends upon the particular application and design constraints imposed on the overall system. Skilled artisans can implement the described functionality in varying ways for each particular application, but such implementation decisions should not be interpreted as causing a departure from the scope of the present inventions.

In addition, while certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions, and changes in the form of the methods and systems described herein may be made without departing from the spirit of the inventions. The accompanying claims and their equivalents are intended to cover such forms or modifications as would fall within the scope and spirit of the inventions.

What is claimed is:

1. A non-transitory computer-readable medium having stored thereon a point-of-sale (POS) security layer configured to communicate with a POS application and a POS server, the POS security layer comprising executable instructions that instruct a computing system to at least:
    intercept actual payment data supplied by a user for performing a payment card transaction, such that the actual payment data is not made available to the POS application;
    pass false payment data to the POS application for use in place of the actual payment data, thereby causing the POS application to transmit the false payment data to the POS server in place of the actual payment data; and
    transmit the actual payment data to the POS server.

2. The computer-readable medium of claim 1, wherein the POS application comprises a shopping cart program of an online store.

3. The computer-readable medium of claim 1, wherein the POS security layer is configured to obtain at least a portion of the false payment data from a security application that runs on the POS server.

4. The computer-readable medium of claim 1, wherein the false payment data comprises a portion of the actual payment data.

5. The computer-readable medium of claim 1, wherein the POS security layer is further configured to encrypt the actual payment data.

6. The computer-readable medium of claim 1, wherein the POS security layer is capable of being invoked indirectly by entry of the payment data into the POS application.

7. The computer-readable medium of claim 1, wherein the POS security layer is capable of being invoked programmatically.

8. The computer-readable medium of claim 1, wherein the actual payment data is transmitted to the POS server over a secure channel.

9. The computer-readable medium of claim 1, in combination with a computing device that is configured to execute the POS security layer.

10. A method of securing payment transactions, the method comprising:
    by a computing system comprising computer hardware:
        intercepting payment data supplied by a user for performing a payment card transaction, the payment data comprising actual payment data from a payment medium;
        accessing false payment data that does not represent valid card data; and
        providing the false payment data to a POS application, the false payment data configured to be processed as if it were the actual payment data, thereby causing the POS application to transmit an authorization request using the false payment data in place of the actual payment data.

11. The method of claim 10, further comprising displaying a substitute payment display configured to facilitate the intercepting of the payment data.

12. The method of claim 10, further comprising encrypting the payment data.

13. The method of claim 10, wherein the false payment data has a card-swipe compatible format.

14. The method of claim 13, wherein at least a portion of the false payment data is derived from a range of card numbers regarded as invalid by one or more card associations.

15. A system for securing payment transactions, the system comprising:
    a computing device programmed to implement a POS security layer configured to:
        capture payment data being sent to a POS application, the payment data comprising actual card data from a payment card;
        obtain false payment data that does not represent valid card data; and
        provide the false payment data to the POS application to thereby cause the POS application to transmit an authorization request using the false payment data in place of the actual card data.

16. The system of claim 15, wherein the POS security layer is further configured to provide a substitute payment display configured to facilitate the intercepting of the payment data.

17. The system of claim 15, wherein the POS security layer is further configured to encrypt the payment data.

18. The system of claim 15, wherein the false payment data has a card-swipe compatible format.

* * * * *